US011320268B2

(12) United States Patent
Jacotot et al.

(10) Patent No.: US 11,320,268 B2
(45) Date of Patent: May 3, 2022

(54) CONSTRUCTION METHOD OF A JOIN FLIGHT PATH TO A MOBILE POINT, ASSOCIATED JOIN METHOD TO A MOBILE POINT, COMPUTER PROGRAM PRODUCT AND MODULE

(71) Applicant: THALES, Courbevoie (FR)

(72) Inventors: Grégoire Jacotot, Valence (FR); Solal Guirand, Valence (FR); Dominique Blanc, Valence (FR)

(73) Assignee: THALES, Courbevoie (FR)

( * ) Notice: Subject to any disclaimer, the term of this patent is extended or adjusted under 35 U.S.C. 154(b) by 181 days.

(21) Appl. No.: 16/584,128

(22) Filed: Sep. 26, 2019

(65) Prior Publication Data
US 2020/0096340 A1 Mar. 26, 2020

(30) Foreign Application Priority Data
Sep. 26, 2018 (FR) ...................... 18 00999

(51) Int. Cl.
*G01C 21/10* (2006.01)
(52) U.S. Cl.
CPC .................. *G01C 21/10* (2013.01)
(58) Field of Classification Search
CPC ........... G01C 21/00–3896; G05D 1/02; G05D 1/0202; G05D 1/0027; G05D 1/0212; G05D 1/12
See application file for complete search history.

(56) References Cited

U.S. PATENT DOCUMENTS

2006/0287781 A1* 12/2006 Bui .................... G05D 1/12
701/3
2018/0033313 A1* 2/2018 Mellema .............. B64C 39/024
2018/0267562 A1* 9/2018 MacCready ......... G08G 5/0069

FOREIGN PATENT DOCUMENTS

FR 2 945 622 A1 11/2010
FR 3 031 175 A1 7/2016

OTHER PUBLICATIONS

French Search Report, from the French Patent Office in counterpart French Application No. 1800999, dated Jun. 13, 2019.
Written Opinion, from the French Patent Office in counterpart French Application No. 1800999, dated Jun. 20, 2019.

* cited by examiner

Primary Examiner — Aaron L Troost
(74) Attorney, Agent, or Firm — ArentFox Schiff LLP

(57) ABSTRACT

The present invention relates to a construction method of a joint flight path to a mobile point including the step of acquiring a first state vector defining the position of the aircraft at the moment $t_0$, acquiring a second state vector defining the position of the mobile point at each moment t after the moment $t_0$. The method further includes determining, for each position of the mobile point, an elementary join flight path of this position of the mobile point from the position of the aircraft defined by the first state vector at the moment $t_0$ with a capture time $T_r$ corresponding to the time of flight of the aircraft on this flight path. The method also includes determining the flight path such that its capture time $T_r$ is substantially equal to the time elapsed between the moment t associated with this trajectory and the moment $t_0$.

7 Claims, 3 Drawing Sheets

CONSTRUCTION METHOD OF A JOIN FLIGHT PATH TO A MOBILE POINT, ASSOCIATED JOIN METHOD TO A MOBILE POINT, COMPUTER PROGRAM PRODUCT AND MODULE

CROSS-REFERENCE TO RELATED APPLICATIONS

This application claims priority to French Patent Application No. 18 00999, filed on Sep. 26, 2018. The disclosure of the priority application is incorporated in its entirety herein by reference.

FIELD OF THE INVENTION

The present invention relates to a construction method of a join flight path to a mobile point.

The present invention also relates to an associated join method to a mobile point, computer program product and module.

The invention more particularly fits within the context of an aircraft navigation system, such as the flight management system, for example. One typical function of such a system is to allow the aircraft to join a fixed point directly. Yet for specific missions (maritime surveillance, ship join, deck landing, refueling on the ground, tracking and separation relative to another aircraft, joining a moving point on land, etc.), it may be necessary to offer such a function expanded to moving points, that is to say, to points whose position changes over time.

BACKGROUND OF THE INVENTION

In the state of the art, the problem of joining a moving point was addressed by using one of the two techniques explained below.

According to a first technique, joining a moving point is done by the indirect use of the function of the flight management system for the direct join of a fixed point with regular updates on the new position of the mobile point.

This technique includes the main flaw of not offering an optimal join flight path, which may extend the join time and lead to overconsumption. Additionally, according to this technique, it is not possible to determine the join point in advance, and it is therefore not possible to anticipate the sequence of the operations.

According to a second technique, the joining of a mobile point is done empirically, manually by the crew or the operator according to the latter's experience with operational situations.

Although this may be effective, this solution does not guarantee that it will be optimal. It is in fact highly dependent on the training and experience of the crew or the operator and remains an additional workload. Furthermore, without implementation within the flight management system, this technique does not allow the crew or the operator to base itself on capacities of this system, for example the display or the automatic guidance.

SUMMARY OF THE INVENTION

The present invention makes it possible to resolve the problem of joining a mobile point by proposing an optimal and predictable join flight path, without increasing the workload of the crew or the operator.

To that end, the invention relates to a construction method of a join flight path of a mobile point in space by an aircraft, including the following steps:

acquisition of a first state vector defining the position of the aircraft and its speed vector at the moment $t_0$;

acquisition of a second state vector defining the position of the mobile point and its speed vector at each moment $t$ after the moment $t_0$, the set of successive positions of the mobile point at different moments $t$ forming a flight path of the mobile point;

determining, for each position of the mobile point defined by the second state vector at a moment $t$, an elementary join flight path of this position of the mobile point from the position and the speed vector of the aircraft defined by the first state vector at the moment $t_0$ with a capture time $T_t$ corresponding to the time of flight of the aircraft on this flight path, each elementary join flight path then being associated with the moment $t$;

among the set of elementary join flight paths, determining a flight path, called effective join flight path, such that its capture time $T_t$ is substantially equal to the time elapsed between the moment $t$ associated with this flight path and the moment $t_0$, this capture time being called meeting time.

According to other advantageous aspects of the invention, the construction method comprises one or more of the following features, considered alone or according to all technically possible combinations:

each elementary join flight path respects a plurality of capture constraints of the trajectory of the mobile point, each capture constraint advantageously being chosen in the group consisting of:
predetermined capture heading;
predetermined capture speed;
predetermined capture altitude;
predetermined capture type;
predetermined capture vector;
predetermined capture time;
predetermined capture zone;

the set of elementary join flight paths defining a capture time function associating, with each moment $t$ associated with one of these elementary join flight paths, a capture time $T_t$ corresponding to this elementary join flight path;

the meeting time is determined iteratively from the capture time function; and when the mobile point moves according to a straight flight path and a constant speed and when each elementary join flight path has a first straight segment followed by a second join segment of the flight path of the mobile point according to a predetermined capture vector at a constant speed, the meeting time is determined according to the following relationship:

$$T = t_{inbnd} + \frac{\sqrt{(SPD' \cdot R')^2 + R'^2(TAS^2 - SPD'^2)} + SPD' \cdot R'}{TAS^2 - SPD'^2},$$

with $SPD' = SPD - W$ $R' = R - INBND + SPD t_{inbnd}$ $t_{inbnd} = INBD / GS_{inbnd}$ where T is the meeting time;

R is a vector connecting the positions of the aircraft and the mobile point at the moment $t_0$;

R' is a norm of the vector R';

SPD' is a norm of the vector SPD';

SPD is the speed vector of the mobile point;

SPD is a norm of the speed vector of the mobile point;

W is the wind vector;

INBD is the predetermined capture vector;

INBD is a norm of the capture vector;

$GS_{INBD}$ is the ground speed on the second segment of each join flight path;

TAS is a norm of a join air vector;

SPD'·R' is a scalar product of the vectors SPD' and R'.

The invention also relates to a join method to a mobile point in space by an aircraft, including the following steps:

defining a mobile point;

determining a first state vector defining the position of the aircraft and its speed vector at the moment $t_0$;

determining a second state vector defining the position of the mobile point and its speed vector at each moment t after the moment $t_0$;

determining an actual join flight path to the mobile point as previously described;

making the aircraft governed by the join flight path.

According to other advantageous aspects of the invention, the join method comprises one or more of the following features, considered alone or according to all technically possible combinations:

the steps for determining the first state vector, the second state vector and the effective join flight path are reiterated several times for different moments $t_0$;

a step for displaying the effective join flight path; and an alert step implemented when no effective join flight path can be determined.

The invention also relates to a computer program product including software instructions which, when implemented by computer equipment, carry out the method for construction of a join flight path as previously defined.

The invention also relates to a construction method of a join flight path to a mobile point in space by an aircraft, including technical means configured to implement the method for construction of a join flight path as previously defined.

BRIEF DESCRIPTION OF THE DRAWINGS

These features and advantages of the invention will appear upon reading the following description, provided solely as a non-limiting example, and done in reference to the appended drawings, in which.

DETAILED DESCRIPTION OF THE INVENTION

Figure 1:
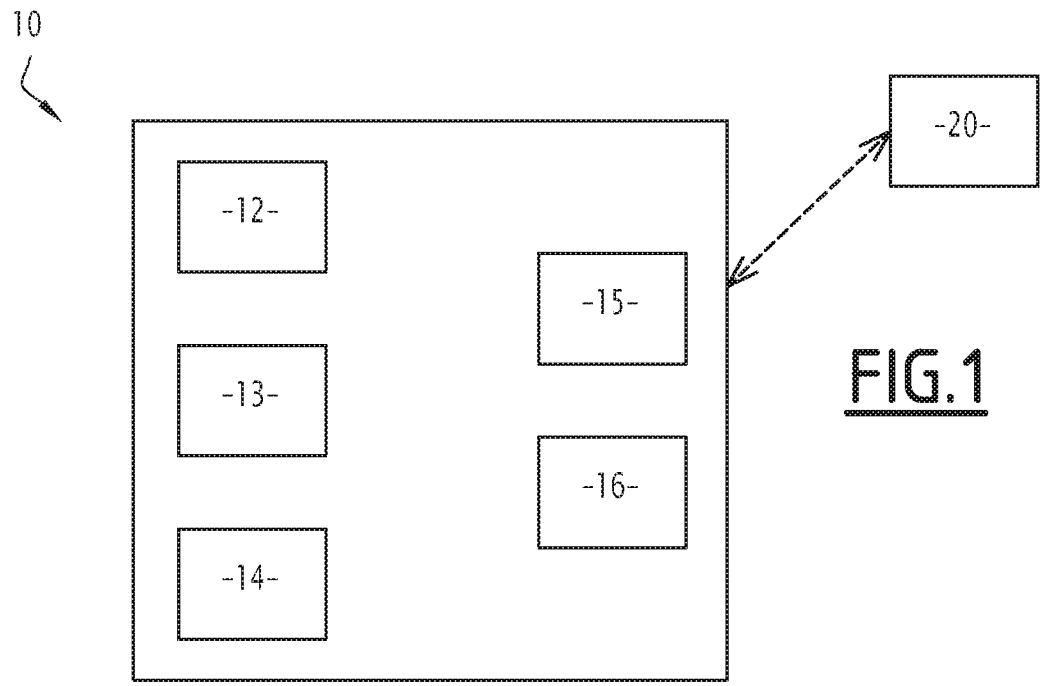
FIG. 1 is a schematic view a flight management system of an aircraft in particular including a module for construction of a join flight path according to the invention.

The flight management system 10 of FIG. 1 is for example a system of the FMS (Flight Management System) type making it possible to plan the flight of an aircraft and to guide it during this flight.

Thus, this flight management system 10 is for example on board the aircraft and is configurable from the cockpit thereof.

According to another exemplary embodiment, this flight management system 10 is arranged at least partially remotely from the aircraft, for example in a ground station, and makes it possible to carry out its planning and/or guidance functions of the flight remotely from the aircraft.

In general, throughout the text, an aircraft refers to any flying vehicle able to be controlled by a crew or autonomously therefrom (in particular in the case of an airplane) or by an operator or autonomously remotely (in particular in the case of a drone).

Furthermore, according to different embodiments, the term "pilot" used hereinafter refers either to one of the members of the crew controlling the aircraft from the latter or to the operator controlling the aircraft remotely.

According to different exemplary embodiments, the aircraft is able to perform one of the following missions defined in relation to a mobile point:

joining a ship or a submarine performing military surveillance (flyover, observation, release of surveillance buoys, etc.);

alignment on an approach axis for deck landing;

alignment on a refueling axis during flight;

establishment of tracking of another vehicle with a given separation;

capture of a land-based mobile point (person, vehicle);

search and rescue operations (at sea, on the ground);

capture at an imposed join time.

In these examples, the mobile point can correspond to the very object of interest (ship, person, vehicle, etc.) or to a virtual point located at a predetermined distance from this object (for example in the case of tracking of another vehicle with a given separation).

In reference to FIG. 1, the flight management system 10 comprises a flight planning module 12, a guidance module 13, a module for defining a mobile point 14, a modeling module 15 and a module for construction of a join flight path 16.

The flight planning module 12 is known in itself. In particular, it allows the pilot to plan a flight for example by introducing the destination, the time of arrival, the waypoints, etc. Equipped with this data, the flight planning module 12 makes it possible to construct an overall flight path of the aircraft.

The flight planning module 12 is for example connected to a man-machine interface 20 allowing the pilot to introduce the aforementioned data and for example to display the overall flight path of the aircraft constructed from these data.

The guidance module 13 makes it possible to command different aeronautics systems to guide the aircraft at least partially autonomously along the flight path constructed by the flight planning module 12 or along a join flight path constructed by the module 16, as will be explained hereinafter.

To that end, the guidance module 13 is able to determine, at any moment t, the position of the aircraft and its speed vector in particular by using information supplied by sensors and external measuring instruments.

In the remainder of the description, "first state vector" at the moment t refers to a vector formed by the position of the aircraft and its speed vector at that moment t. This first state vector will be denoted hereinafter by the reference PA(t).

The module for defining a mobile point 14 makes it possible to define a mobile point to be joined.

Such a mobile point is for example defined as a function of the mission performed by the aircraft manually by the entry of its position and its speed vector at a given moment.

This entry is done for example by the pilot via the man-machine interface 20 and can further comprise other information relative to the mobile point, for example a particular type of its trajectory (straight, circular, etc.).

According to another exemplary embodiment, such a mobile point is defined automatically by for example using data supplied by an external observation system.

This observation system for example has a radar, a sensor, a camera, a remote measurement means or a combination of these devices.

According to an exemplary embodiment, defined manually or automatically, the position of the mobile point is next redefined by using data supplied in real time or according to predetermined time intervals by an external observation system as defined above.

The modeling module 15 makes it possible to model the future flight path of the mobile point defined by the module 14.

In particular, the modeling module 15 makes it possible to build a second state vector defining the position of the mobile point and its speed vector at each future moment t.

This second state vector is built from the set of data available on the mobile point and supplied by the module 14.

Thus for example, when the mobile point is defined as a point moving along a straight flight path with a constant speed, the second state vector is determined by the initial speed of the mobile point and by its position evolving in proportion to this speed.

When the mobile point moves along a curved flight path and/or with a variable speed, the second state vector is defined by extrapolating its speeds and/or its observed positions. This second state vector is for example updated regularly by using the data supplied by an outside observation system as previously defined.

Of course, other methods for predicting the flight path of the mobile point known in themselves in the state of the art can be used.

Hereinafter, the second state vector will be denoted by the reference PM(t).

The module for constructing a join flight path 16 makes it possible to construct a join flight path to the mobile point by implementing a method 100 for constructing a join flight path explained in detail hereinafter.

Furthermore, this construction module 16 makes it possible to construct such a flight path as a function of the plurality of constraints, in particular capture constraints relative to the manner of joining the mobile point.

Thus, for example, each capture constraint is chosen from the group consisting of:
predetermined capture heading;
predetermined capture speed;
predetermined capture altitude;
predetermined capture type;
predetermined capture vector;
predetermined capture time;
predetermined capture zone.

These constraints are for example determined manually by the pilot as a function of the selected mobile point or automatically as a function of this point.

According to an exemplary embodiment, each of the aforementioned modules 12 to 16 assumes the form of software stored in a memory of the system 10 and implemented by a processor of this system.

According to another exemplary embodiment, at least one of these modules 12 to 16 at least partially assumes the form of a programmable logic circuit, for example of the FPGA (Field-Programmable Gate Array) type.

Figure 2:
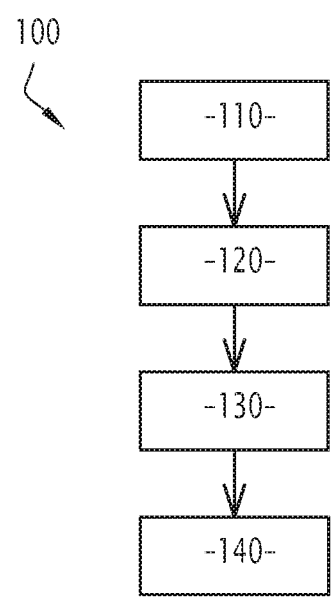
FIG. 2 is a flowchart of a method for construction of a join flight path according to the invention, the construction method being implemented by the construction module of FIG. 1.

The method 100 for constructing a join flight path implemented by the construction module 16 will now be explained in reference to FIG. 2, showing a block diagram of its steps.

Initially, it is assumed that a mobile point is defined by the module 14 at an initial moment $t_0$ and its future flight path is modeled by the module 15.

During step 110, the construction module 16 acquires a first state vector defining the position of the aircraft and its speed vector at the moment $t_0$. In other words, during this step, the construction module 16 acquires the vector $PA(t_0)$ for example, as previously indicated, coming from the guidance module 13.

During the following step 120, the construction module 16 acquires the second state vector defining the position of the mobile point and its speed vector at each moment t after the moment $t_0$. In other words, during this step, the construction module 16 acquires the vector PM(t), $t > t_0$. This vector then defines the future flight path of the mobile point predicted by the modeling module 15.

During the following step 130, the construction module 16 determines an elementary join flight path for each position of the mobile point defined by the second state vector PM(t) at a moment t, from the position in the speed vector of the aircraft defined by the first state vector $PA(t_0)$ at the moment $t_0$.

Each elementary join flight path is defined using methods known in themselves making it possible to join a fixed point. Indeed, each position of the mobile point defined by the second state vector PM(t) at a moment t has a fixed point.

Each elementary join flight path is then associated with a moment t defining the position of the mobile point in the join point of its flight path.

Furthermore, each elementary join flight path defines a capture time $T_t$ corresponding to the flight time of the aircraft on this flight path.

In other words, the set of elementary join flight paths define, for each moment t, a capture time $T_t$. The capture time therefore takes the form of a function at different moments t. This function is subsequently called capture time function.

Optionally, when one or several capture constraints are defined, each elementary join flight path is determined as a function of these constraints also according to methods known in themselves.

During the following step 140, the construction module 16 determines, among the set of elementary join flight paths, a flight path, called effective join flight path, such that its capture time $T_t$ is substantially equal to the time elapsed between the moment t associated with this flight path and the moment $t_0$. The capture time $T_t$ of the effective join flight path is subsequently called meeting time and denoted using reference T.

In other words, during this step 140, the construction module 16 determines an elementary join flight path for which $T_t = t - t_0$, that is to say, the capture time $T_t$ of which is substantially equal to the time elapsed between the moment t associated with this elementary flight path and the moment $t_0$.

The effective join flight path therefore effectively makes it possible to join the mobile point and not only the flight path of this point as is the case for each elementary join flight path.

Figure 3:
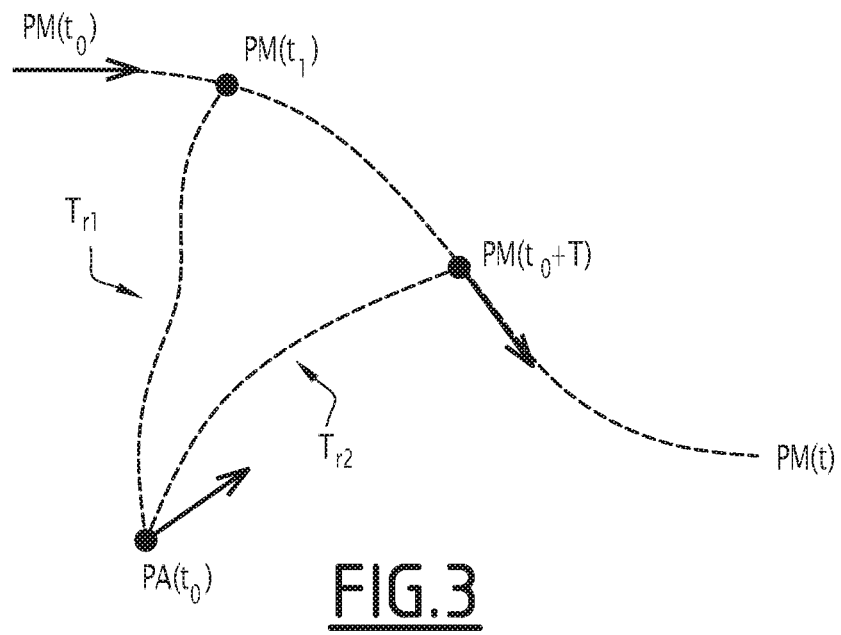
FIGS. 3 and 4 are schematic views illustrating the implementation of the construction method of FIG. 2.

An exemplary embodiment of this step 140 is illustrated in FIG. 3.

In particular, this FIG. 3 illustrates the speed vector of the aircraft defined by the first state vector $PA(t_0)$ at the moment $t_0$ as well as the flight path of the mobile point defined by the second state vector $PM(t)$ and two speed vectors of this mobile point at the moments $t_0$ and $t_0+T$.

FIG. 3 also illustrates two elementary join flight paths determined during the previous step 130 and denoted by references $Tr_1$ and $Tr_2$.

The flight path $Tr_1$ intersects the flight path of the mobile point in the position of the mobile point defined by the second state vector $PM(t_1)$ at the moment $t_1$. This flight path $Tr_1$ is therefore associated with the moment $t_1$.

The flight path $Tr_2$ intersects the flight path of the mobile point in the position of the mobile point defined by the second state vector $PM(T)$ at the moment $t_0+t'$ where $t'$ is equal to T. The flight path $Tr_2$ is therefore determined during step 140 as an effective join flight path.

According to one advantageous exemplary embodiment of the invention, step 140 is implemented in different ways as a function of the type of flight path of the mobile point and elementary join flight paths.

Thus, for example, when the mobile point moves according to a straight flight path with a constant speed and when each join flight path has a first straight segment followed by a second join segment of the flight path of the mobile point according to a predetermined capture vector at a constant speed, the effective join flight path can be found using the following relationship:

$$(TAS+W)(T-t_{inbnd})+\text{INBND}=R+SPD\cdot T$$

where
T is the meeting time;
TAS is a join air vector;
W is the wind vector;
$t_{inbnd}$ is the flight time on the second join segment;
INBD is the predetermined capture vector;
R is the vector connecting the positions of the aircraft and the mobile point at the moment $t_0$; and
SPD is the speed vector of the mobile point.

Figure 4:
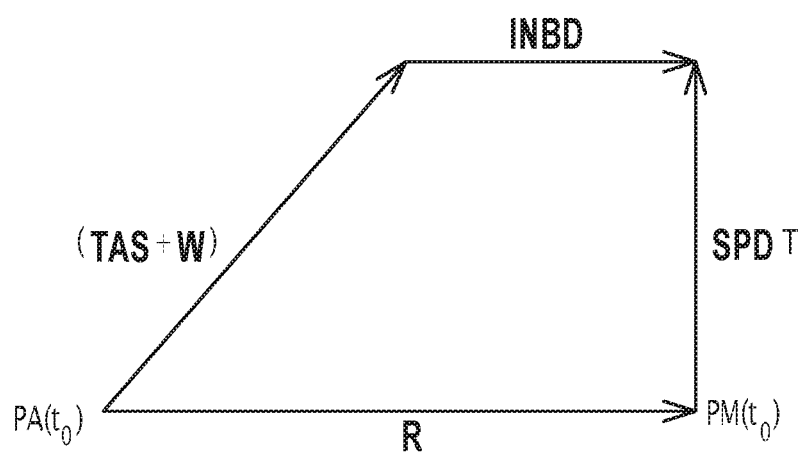

This relationship is relationship is obtained from the vectorial equality illustrated in FIG. 4.

The meeting time T can thus be obtained by using the following formula:

$$T = t_{inbnd} + \frac{\sqrt{(SPD'\cdot R')^2 + R'^2(TAS^2 - SPD'^2)} + SPD'\cdot R'}{TAS^2 - SPD'^2},$$

with $SPD' = SPD - W$ $R' = R - INBND + SPDt_{inbnd}$ $t_{inbnd} = INBD / GS_{inbnd}$ where
R' is a norm of the vector R';
SPD' is a norm of the vector SPD';
SPD is a norm of the vector SPD;
INBD is a norm of the capture vector;

$GS_{INBD}$ is the ground speed on the second segment of each join flight path;
TAS is a norm of the vector TAS;
SPD'·R' is a scalar product of the vectors SD' and R'.

This last formula also means that when $TAS^2-SPD'^2<0$, the join is not possible.

Furthermore, this formula remains applicable when each join flight path has only a first straight segment, that is to say, when the predetermined capture vector INBD is substantially nil.

When the flight path of the mobile point and/or the elementary join flight paths have curved flight paths and/or the movement speed of the mobile point is not constant, the effective join flight path is determined by solving the equation $T_r=t-t_0$ numerically, and therefore using the capture time function previously defined.

To that end, the construction module 16 for example applies an iterative numerical method known in itself, such as the dichotomy solution method or the regula falsi method. A first iteration of such a method is for example done from the predetermined values $t_1$ and $t_2$.

Of course, this last technique can also be used when the mobile point moves according to a straight flight path with a constant speed and when each join flight path has one or several straight segments.

Figure 5:
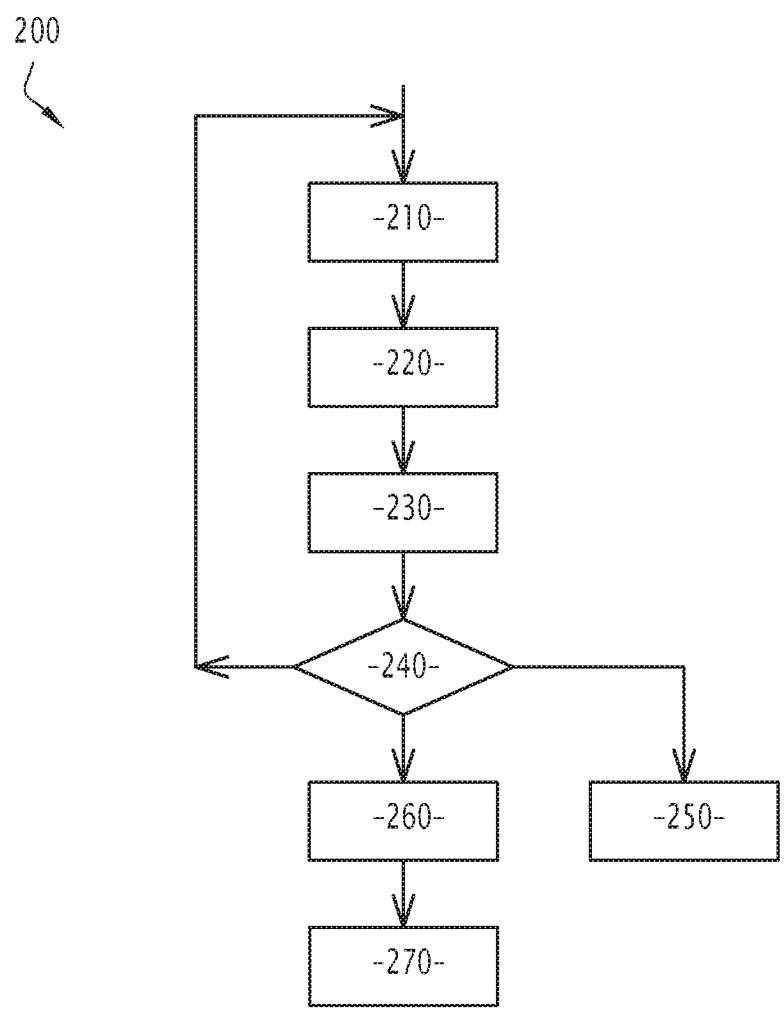
FIG. 5 is a flowchart of a join method to a mobile point according to the invention, the join method being implemented by the flight management system of FIG. 1.

A join method 200 to a mobile point by the aircraft implemented by the flight management system 10 will now be explained in reference to FIG. 5, showing a flowchart of its steps.

Initially, the aircraft is in flight and no mobile point has yet been defined.

During step 210, the system 10 defines a mobile point to be joined.

As previously explained, this mobile point is defined by the module 14 following a manual entry by the pilot or then automatically by this module.

Optionally, during this step, the pilot for example uses the man-machine interface 20 to enter other information relative to the mobile point as well as capture constraints.

As previously stated, these capture constraints can also be determined automatically by the module 14.

Then, during step 220, the guidance module 13 acquires a first state vector defining the position of the aircraft and its speed vector at the moment $t_0$ for example corresponding to the current moment.

Then, during step 230, the modeling module 15 defines a second state vector defining the position of the mobile point and its speed vector at each moment t after the moment $t_0$.

Then, during step 240, the construction module 16 determines an effective join flight path by implementing the construction method 100 previously explained.

When it is not possible to determine such a join flight path while respecting all of the constraints, the construction module 16 issues an alert to the pilot for example using the man-machine interface 20, during step 250.

According to one exemplary embodiment, during this step 250, the pilot has a possibility of redefining the mobile point and/or the associated capture constraints by again implementing the method 200.

When an effective join flight path has been able to be determined, this flight path is for example displayed to the pilot, during step 260, via the man-machine interface 20, optionally with other information relative to this flight path, such as the associated capture time $T_r$.

Optionally after validation done by the pilot, during step 270, the effective join flight path is sent to the guidance module 13, which governs this flight path to guide the aircraft.

According to one exemplary embodiment, steps 210 to 240 are reiterated several times for different moments $t_0$. This is in particular done when new information relative to the mobile point has been obtained, for example its updated position and speed.

One can then see that the invention has a certain number of advantages.

The invention indeed makes it possible to build a join flight path to a mobile point while respecting capture constraints related to this point.

Furthermore, this flight path is optimal because it is chosen from among a plurality of obtained elementary flight paths including fixed points according to conventional methods.

The invention also allows the aircraft to be governed on the determined flight path, thus decreasing the workload of the pilot.

The invention claimed is:

1. A join method to a mobile point in space by an aircraft, including the following steps:
    defining the mobile point;
    determining a first state vector defining a first position of the aircraft and a first speed vector at an initial moment $t_0$;
    determining a second state vector defining a second position of the mobile point and a second speed vector at each moment of different moments after the initial moment $t_0$, wherein a set of successive positions of the mobile point at the different moments form a flight path of the mobile point;
    determining an effective join flight path to the mobile point by:
        determining, for each position of the set of successive positions of the mobile point defined by the second state vector at a moment t of the different moments, an elementary join flight path, of a set of elementary join flight paths, of the position from the first position and the first speed vector of the aircraft defined by the first state vector at the initial moment $t_0$ with a capture time $T_t$ corresponding to a time of flight of the aircraft on the elementary join flight path being associated with the moment t;
        determining the effective join flight path, selected from among the set of elementary join flight paths, such that a capture time $T_t$ is substantially equal to a time elapsed between the moment t associated with the selected elementary flight path and the initial moment $t_0$; and
    governing the aircraft on the effective join flight path;
    wherein the steps for determining the first state vector, the second state vector and the effective join flight path are reiterated several times for different initial moments;
    wherein when the mobile point moves according to a straight flight path and a constant speed and when each elementary join flight path has a first straight segment followed by a second join segment of the flight path of the mobile point according to a predetermined capture vector at a constant speed, a meeting time is determined according to the following relationship:

$$T = t_{inbnd} + \frac{\sqrt{(SPD' \cdot R')^2 + R'^2(TAS^2 - SPD'^2)} + SPD' \cdot R'}{TAS^2 - SPD'^2},$$

with $SPD' = SPD - W,$ $R' = R - INBND + SPD t_{indnd},$ $t_{inbnd} = INBD / GS_{inbnd}$ where
T is the meeting time;
R is a vector connecting the positions of the aircraft and the mobile point at the initial moment $t_0$;
R' is a norm of the vector R';
SPD' is a norm of the vector SPD';
SPD is the speed vector of the mobile point;
SPD is a norm of the speed vector of the mobile point;
W is a wind vector;
INBD is the predetermined capture vector;
INBD is a norm of the capture vector;
$GS_{INBD}$ is a ground speed on the second segment of each join flight path;
TAS is a norm of a join air vector;
SPD'·R' is a scalar product of the vectors SPD' and R'.

2. The method according to claim 1, wherein each elementary join flight path respects a plurality of capture constraints of a trajectory of the mobile point, each capture constraint advantageously being chosen in the group consisting of:
    predetermined capture heading;
    predetermined capture speed;
    predetermined capture altitude;
    predetermined capture type;
    predetermined capture vector;
    predetermined capture time;
    predetermined capture zone.

3. The method according to claim 1, wherein:
    defining a capture time function associating, with each moment associated with one of the set of elementary join flight paths, a corresponding capture time corresponding to the elementary join flight path based on the set of elementary join flight paths;
    the meeting time is determined iteratively from the capture time function.

4. The method according to claim 1, further including a step for displaying the effective join flight path.

5. The method according to claim 1, further including an alert step implemented when no effective join flight path can be determined.

6. A non-statutory computer readable medium comprising software instructions that, when implemented by a computer equipment of an aircraft, causes the computer equipment to:
    define a mobile point;
    determine a first state vector defining a first position of the aircraft and a first speed vector at an initial moment $t_0$;
    determine a second state vector defining a second position of the mobile point and a second speed vector at each moment of different moments after the initial moment $t_0$, wherein a set of successive positions of the mobile point at the different moments form a flight path of the mobile point;
    determine an effective join flight path to the mobile point by:
        determining, for each position of the set of successive positions of the mobile point defined by the second state vector at a moment t of the different moments, an elementary join flight path, of a set of elementary join flight paths, of the position from the first position and the first speed vector of the aircraft defined by the first state vector at the initial moment $t_0$ with a capture time $T_t$ corresponding to a time of flight of the aircraft on the elementary join flight path being associated with the moment t;
        determining the effective join flight path, selected from among the set of elementary join flight paths, such that a capture time $T_t$ is substantially equal to a time elapsed between the moment t associated with the selected elementary flight path and the initial moment $t_0$; and govern the aircraft on the effective join flight path;

wherein when the mobile point moves according to a straight flight path and a constant speed and when each elementary join flight path has a first straight segment followed by a second join segment of the flight path of the mobile point according to a predetermined capture vector at a constant speed, a meeting time is determined according to the following relationship:

$$T = t_{inbnd} + \frac{\sqrt{(SPD' \cdot R')^2 + R'^2(TAS^2 - SPD'^2)} + SPD' \cdot R'}{TAS^2 - SPD'^2},$$

with $SPD' = SPD - W,$ $R' = R - INBND + SPD t_{inbnd},$ $t_{inbnd} = INBD / GS_{inbnd}$ where T is the meeting time;

R is a vector connecting the positions of the aircraft and the mobile point at the initial moment $t_0$;

R' is a norm of the vector R';

SPD' is a norm of the vector SPD';

SPD is the speed vector of the mobile point;

SPD is a norm of the speed vector of the mobile point;

W is a wind vector;

INBD is the predetermined capture vector;

INBD is a norm of the capture vector;

$GS_{INBD}$ is a ground speed on the second segment of each join flight path;

TAS is a norm of a join air vector;

SPD'·R' is a scalar product of the vectors SPD' and R'.

7. A construction module of a join flight path to a mobile point in space by an aircraft, comprising:

means for defining a mobile point;

means for determining a first state vector defining a first position of the aircraft and a first speed vector at an initial moment $t_0$;

means for determining a second state vector defining a second position of the mobile point and a second speed vector at each moment of different moments after the initial moment $t_0$, wherein a set of successive positions of the mobile point at the different moments form a flight path of the mobile point;

means for determining an effective join flight path to the mobile point including:

means for determining, for each position of the set of successive positions of the mobile point defined by the second state vector at a moment t of the different moments, an elementary join flight path, of a set of elementary join flight paths, of the position from the first position and the first speed vector of the aircraft defined by the first state vector at the initial moment to with a capture time $T_t$ corresponding to a time of flight of the aircraft on the elementary join flight path being associated with the moment t;

means for determining the effective join flight path, selected from among the set of elementary join flight paths, such that a capture time $T_t$ is substantially equal to a time elapsed between the moment t associated with the selected elementary flight path and the initial moment $t_0$; and means for governing the aircraft on the effective join flight path;

wherein when the mobile point moves according to a straight flight path and a constant speed and when each elementary join flight path has a first straight segment followed by a second join segment of the flight path of the mobile point according to a predetermined capture vector at a constant speed, a meeting time is determined according to the following relationship:

$$T = t_{inbnd} + \frac{\sqrt{(SPD' \cdot R')^2 + R'^2(TAS^2 - SPD'^2)} + SPD' \cdot R'}{TAS^2 - SPD'^2},$$

with $SPD' = SPD - W,$ $R' = R - INBND + SPD t_{inbnd},$ $t_{inbnd} = INBD / GS_{inbnd}$ where T is the meeting time;

R is a vector connecting the positions of the aircraft and the mobile point at the initial moment to;

R' is a norm of the vector R';

SPD' is a norm of the vector SPD';

SPD is the speed vector of the mobile point;

SPD is a norm of the speed vector of the mobile point;

W is a wind vector;

INBD is the predetermined capture vector;

INBD is a norm of the capture vector;

$GS_{INBD}$ is a ground speed on the second segment of each join flight path;

TAS is a norm of a join air vector;

SPD'·R' is a scalar product of the vectors SPD' and R'.

* * * * *